Dec. 14, 1926.                                           1,610,679
R. D. HOADLEY
KICK PREVENTING DEVICE FOR ANIMALS
Filed March 17, 1926
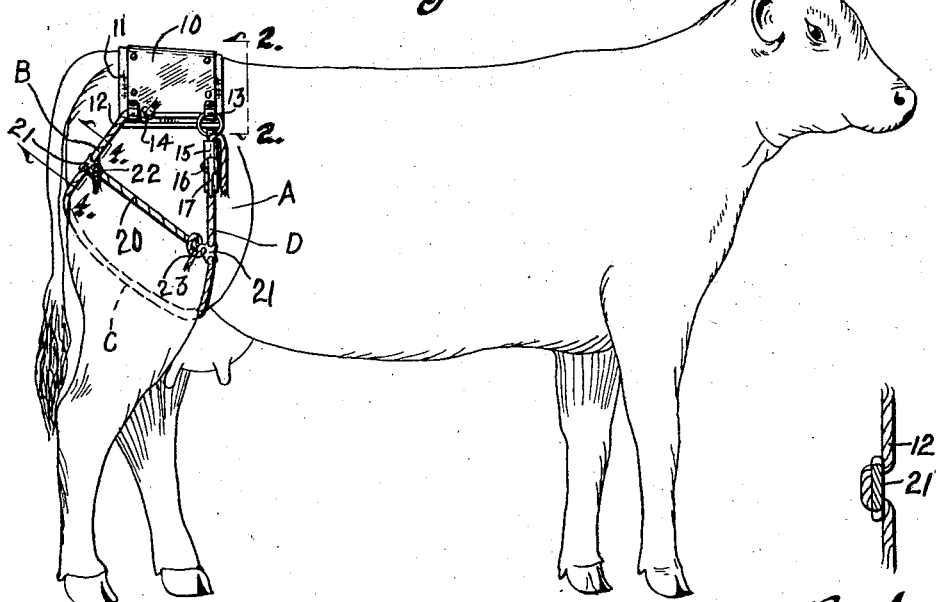
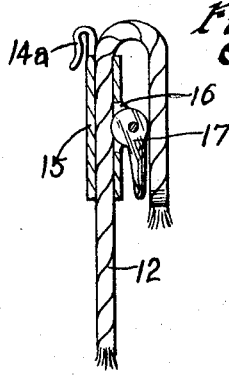
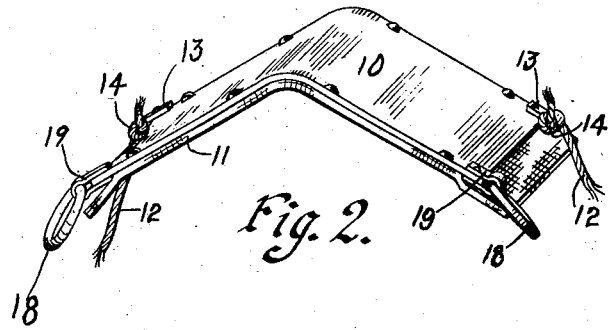
Witness
L. F. Sandberg
Inventor
Robert D. Hoadley
by Bair & Freeman Attorneys Patented Dec. 14, 1926.

1,610,679

UNITED STATES PATENT OFFICE.

ROBERT D. HOADLEY, OF KANAWHA, IOWA.

KICK-PREVENTING DEVICE FOR ANIMALS.

Application filed March 17, 1926. Serial No. 95,261.

The object of my invention is to provide a kick preventing device for animals which is of comparatively simple, durable and inexpensive construction.

More particularly it is my object to provide a device which will effectually prevent the forward movement of the leg of the animal which movement is necessary before the animal can kick.

A further object is to provide such a device which may be quickly and conveniently applied or removed and is made adjustable for use on different sizes of animals.

Still a further object is to provide such a device having the parts so arranged that when used on a cow, the flow of milk will not be restricted.

With these and other objects in view my invention consists in the construction, arrangement and combination of the various parts of my device, whereby the objects contemplated are attained, as hereinafter more fully set forth, pointed out in my claims, and illustrated in the accompanying drawings in which:

Figure 1, illustrates my device in use as applied to a cow.

Figure 2, is a perspective view of a portion of the device looking as in the direction of the arrows 2—2 on Figure 1.

Figure 3, is a sectional view of a clamping device used in connection with my invention.

Figure 4, is a detail sectional view on the line 4—4 of Figure 1.

In my experience with milking cows I have found that if the animal starts to kick, pressure at the point A will so hamper the muscles of the leg that it cannot be moved forward.

Without this forward movement the animal cannot kick.

I have therefore, provided a device which will prevent this forward movement.

On the accompanying drawings I have used the reference numeral 10 to indicate a pad member which may be of metal or any other suitable material.

A piece of canvas or rubber 11 is riveted or otherwise secured to the pad member 10 so that the pad member 10 will not rub and injure the skin of the animal.

A flexible member such as a rope 12 is inserted through a loop 13 secured to the pad member 10.

A knot 14 is then tied in the rope for keeping it in the loop 13.

It may here be mentioned that there are ropes 12 on each side of the animal and that the ropes 12 have hook members 14a on their free ends.

The hook member 14a is part of a sleeve 15 which is designed to receive the rope 12.

Ears 16 are formed on the sleeve 15 between which an eccentric lever 17 is pivoted.

It will therefore, be seen that by manipulating the lever 17 the rope is released and may be lengthened or shortened relative to the hook 14a and that the lever 17 may then be employed to secure the rope firmly within the sleeve 15.

This adjustment is necessary when the device is used on different sizes of cows or on other animals of different sizes.

The hook 14a is designed to coact with a ring 18 in a loop 19 which is also secured to the pad member 10.

In operation the rope 12 is adjusted in the sleeve 15 to suit the size of the animal to which the device is applied.

The ropes 12 are then passed over the legs as at B and under them as at C shown in dotted lines in Figure 1 and then up over the portion A of the leg as at D.

This effectually prevents the forward movement of the leg necessary to kick.

For more vicious animals I have found that it is desirable to have cross ropes 20 at least on the milking side of the cow.

The ropes 20 are fastened to the ropes 12 by triangular perforated members 21.

A knot 22 is formed on one end of the rope 20 and the other end of the rope 20 is inserted through the member 21 and has formed on it a loop 23 which may easily be untied for readjusting the length of the rope 20.

The rope 12 extends through the member 21 as shown in Figure 4 so that it may be adjusted along the rope 12 to different positions.

It will therefore be seen that I have provided a device for use on vicious animals which effectually prevents a forward movement of the leg and therefore prevents the animal kicking.

I have used this on quite a number of cows and find that the worst of them will stand while being milked after two or three applications of my device.

When they are extremely vicious it is necessary to also use the cross rope 20.

Many cows begin to kick when a milking machine is used. In starting the machine they are frightened and often kick the teat cups off.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a device of the class described, a pad member for resting on the back of an animal, flexible members secured thereto for encircling the rear legs of said animal, the free ends of said flexible members being provided with hook members slidably mounted on said flexible members and capable of being clamped thereto for hooking said free ends to said pad member.

2. In a device of the class described, a pad member for resting on the back of an animal, flexible members secured thereto for encircling the rear legs of said animal, the free ends of said flexible members being provided with hook members slidably mounted on said flexible members and capable of being clamped thereto, means on said pad member for coaction with said hook members.

3. In a device of the class described, a pad member for resting on the back of an animal, flexible members secured thereto for encircling the rear legs of said animal, the free ends of said flexible members being provided with hook members slidably mounted on said flexible members and capable of being clamped thereto, means on said pad member for coaction with said hook members, flexible cross members secured to said flexible members for tightening across the legs of said animal.

4. In a device of the class described, a pad member for resting on the back of an animal, flexible members secured thereto for encircling the rear legs of said animal, flexible members for tightening across the legs of said animal, said flexible cross members being adjustably arranged as to length.

ROBERT D. HOADLEY.